Patented Oct. 21, 1930

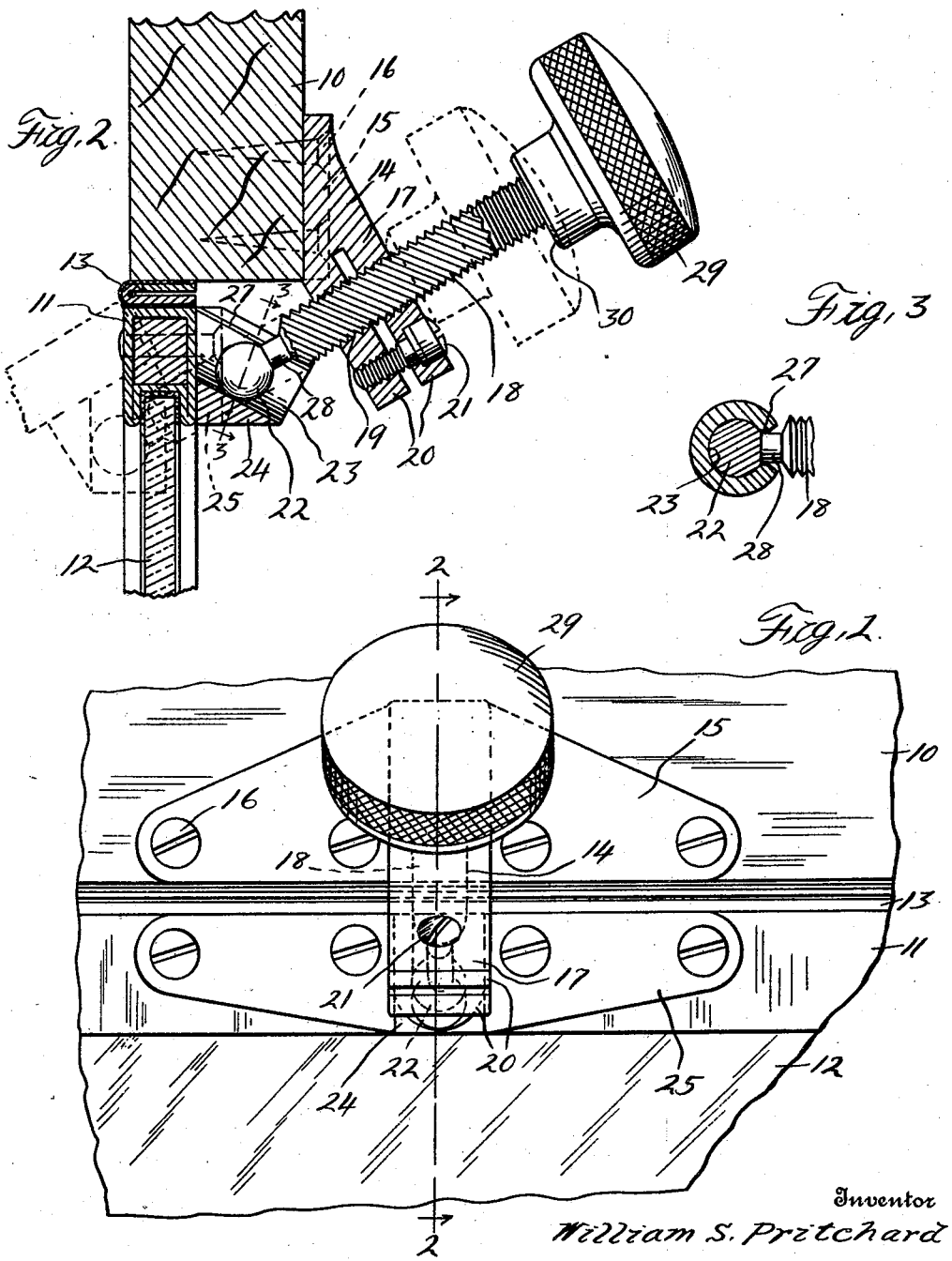

1,778,812

UNITED STATES PATENT OFFICE

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK

WINDSHIELD-OPERATING MECHANISM

Application filed December 12, 1927. Serial No. 239,585.

This invention relates to windshield operating mechanism and more particularly to a construction and arrangement of parts tending to simplify, render more efficient and improve the same generally.

The present day development of motor vehicle body designs and the trend of the refinement of the appurtenances and the equipment associated therewith demands the elimination of the windshield arms or sectors which previously were associated with the sides of the windshield and employed for operating and holding the windshield in its several positions of adjustment. It is now quite customary to provide unitary operating mechanisms for adjusting the windshield but heretofore the nature of such operating mechanisms and the necessity of altering or modifying the body construction to accommodate them has prohibited their use upon cheaper priced cars.

It is therefore one of the primary objects of this invention to provide a unitary windshield operating mechanism which may be quickly and economically manufactured in large quantities and which may be associated with the windshield and installed upon the motor vehicle body in an expeditious manner without necessitating any alterations in the windshield or body design.

The above and many other objects and advantages and novel details of construction of one embodment of this invention will be made more apparent as this description proceeds, especially when considered in connection with the accompanying drawings, wherein:

Figure 1 is a fragmentary front elevational view of a windshield and header together with my improved operating mechanism.

Figure 2 is a vertical sectional view taken substantially on the plane indicated by line 2—2 in Figure 1, and Figure 3 is a detail sectional view taken substantially on the plane indicated by line 3—3 in Figure 2.

Referring now more particularly to the drawings wherein like reference characters indicate like parts it will be noted that there is fragmentarily illustrated as at 10 the header or adjacent frame or body portion of the vehicle to which the sash or frame 11 of the windshield 12 is connected as for instance by means of a hinge 13. By reason of this construction the windshield is horizontally supported for a swinging movement outwardly or inwardly or both as is customary with many types of windshield construction.

Mounted upon the header or frame part 10 is a bracket 14 provided with lateral extensions or portions 15 through which screws, bolts or other securing means 16 are passed for securing this bracket to the header or frame part 10. The bracket is also formed with a depending arm or portion 17 constituting a support for a windshield operating element 18. This member 18 is herein illustrated as a screw shaft or threaded member extending through a threaded aperture 19 formed in the arm 17. The end of the arm 17 may be slotted or bifurcated to form furcations 20 which may be adjusted or sprung toward one another by means of a screw or the like 21 for taking up any wear between the threaded member 18 and threaded recess 19. In this way the connection between these two parts is always maintained tight and rattleproof.

One end of threaded member 18 is provided with a head 22 herein shown as of substantially spherical conformation. This head or end 22 slidably engages in the bore 23 of a bracket 24 provided with ears or extensions 25 through which bolts, rivets, screws or other securing means may be passed for attaching bracket 24 to the windshield sash or frame 11. The bore 23 of bracket 24 extends in a plane inclined to the plane of the windshield as illustrated in the drawings and the bracket is slotted longitudinally of the bore as indicated at 27 to accommodate the reduced portion or neck 28 of the threaded member 18. Thus while a sliding connection is provided between the operating member 18 and the bracket 24 disengagement of these parts is prevented as the head 22 is of a diameter larger than the slot 27 and as a consequence can not pass therethrough.

The other end of the operating member 18 is provided with a knob or handle 29 by means of which this operating element may be rotated. As a convenient means for limiting the movement of the operating element 18 in one direction the knob or handle 29 is formed with a shoulder 30 which in extreme open position of the windshield engages the adjacent face of arm 17. The windshield is shown in full closed position in full lines in Figure 2 and in full open position by dotted lines in this figure.

The operation of the herein described construction is too obvious to demand further description. However, it should be noted that bracket 14 may be secured to the header or frame of the motor vehicle body without requiring any alteration or modification thereof such as slotting, recessing or the like, as is necessary with many other types of windshield operating mechanisms now in commercial use. In a like manner bracket 24 may be secured to the sash or frame of the windshield without altering or modifying the latter. The pitch of the threads on the operating element 18 may be altered as desired so that a greater or less number of turns will be required to move the windshield from closed to full open position or vice-versa. In any event the operating mechanism is self-locking and the windshield will be held in any of its adjusted positions. By bifurcating or slotting the lower end of bracket arm 17 a simple but efficient means is provided for compensating for wear between the threads of the operating member 18 and the threaded aperture 19.

While one embodiment of the invention has been described and illustrated herein somewhat in detail it will be apparent to those skilled in this art that various changes in the essential and all of the non-essential details of construction may be resorted to without departing from the spirit and scope of this invention and to this end reservation is made to make such changes as may come within the purview of the accompanying claims.

What I claim as my invention is:—

1. The combination with a vehicle body part and a windshield supported thereon, of operating mechanism therefor including a bracket secured to said body part, an axially movable operating element having a fixed axis of rotation carried by said bracket and a member carried by said windshield and slidably connected to said operating element and constituting a compensating connection between said windshield and operating element.

2. The combination with a vehicle body part and a windshield supported thereby, of windshield operating mechanism including, an operating member, means secured to said body part for supporting said operating member for longitudinal adjustment in a fixed plane, a member carried by said windshield and means for slidably connecting an end of said operating member to said latter means whereby movement of said operating member effects an adjustment of said windshield.

3. The combination with a vehicle body part and a windshield supported thereby, of windshield operating mechanism including, a longitudinally adjustable member, means for supporting said member upon said body part for movement in a fixed plane, a member carried by said windshield provided with an elongated recess and means on said longitudinally adjustable member slidably engageable in said recess whereby adjustment of said longitudinally adjustable member effects an adjustment of said windshield.

4. The combination with a vehicle body part and a windshield supported thereby, of windshield operating mechanism including, a bracket carried by said body part, a threaded operating member engaging a threaded opening in said bracket and movable in a fixed plane, a bracket carried by said windshield and means for slidably connecting the end of said operating member to said bracket whereby said windshield may be adjusted in both directions by adjusting said operating member.

5. The combination with a vehicle body part and a windshield supported thereby, of windshield operating mechanism including, a bracket secured to said body part, a longitudinally adjustable operating member carried by said bracket, a bracket secured to said windshield, and provided with a recess, the end of said operating member extending through a slot in said latter bracket and slidably engaging said recess whereby an adjustment of said operating member effects an adjustment of said windshield.

6. The combination with a vehicle body part and a windshield supported thereby, of windshield operating mechanism including, a bracket secured to said body part, a longitudinally adjustable operating member threadedly engaging and extending through an aperture in said bracket, a bracket carried by said windshield provided with a bore one wall of which is formed with a slot, the end of said operating member extending through said slot and into said bore whereby said windshield is operatively connected to said operating member.

7. The combination with a vehicle body part and a windshield supported thereby, of windshield operating mechanism including, a supporting bracket secured to said body part, said bracket being formed with a pair of spaced arms provided with aligned threaded apertures, a threaded operating element extending through said aligned apertures and longitudinally adjustable with respect to said bracket, means connecting said operating element to said windshield and means for relatively moving said arms to compensate for wear between the engaging portions of said bracket and operating element.

In testimony whereof I affix my signature.

WILLIAM S. PRITCHARD.